Aug. 11, 1953 P. M. CHRISTENSEN 2,648,736
AUTOMATIC CIRCUIT BREAKER
Filed Oct. 8, 1949 2 Sheets-Sheet 1
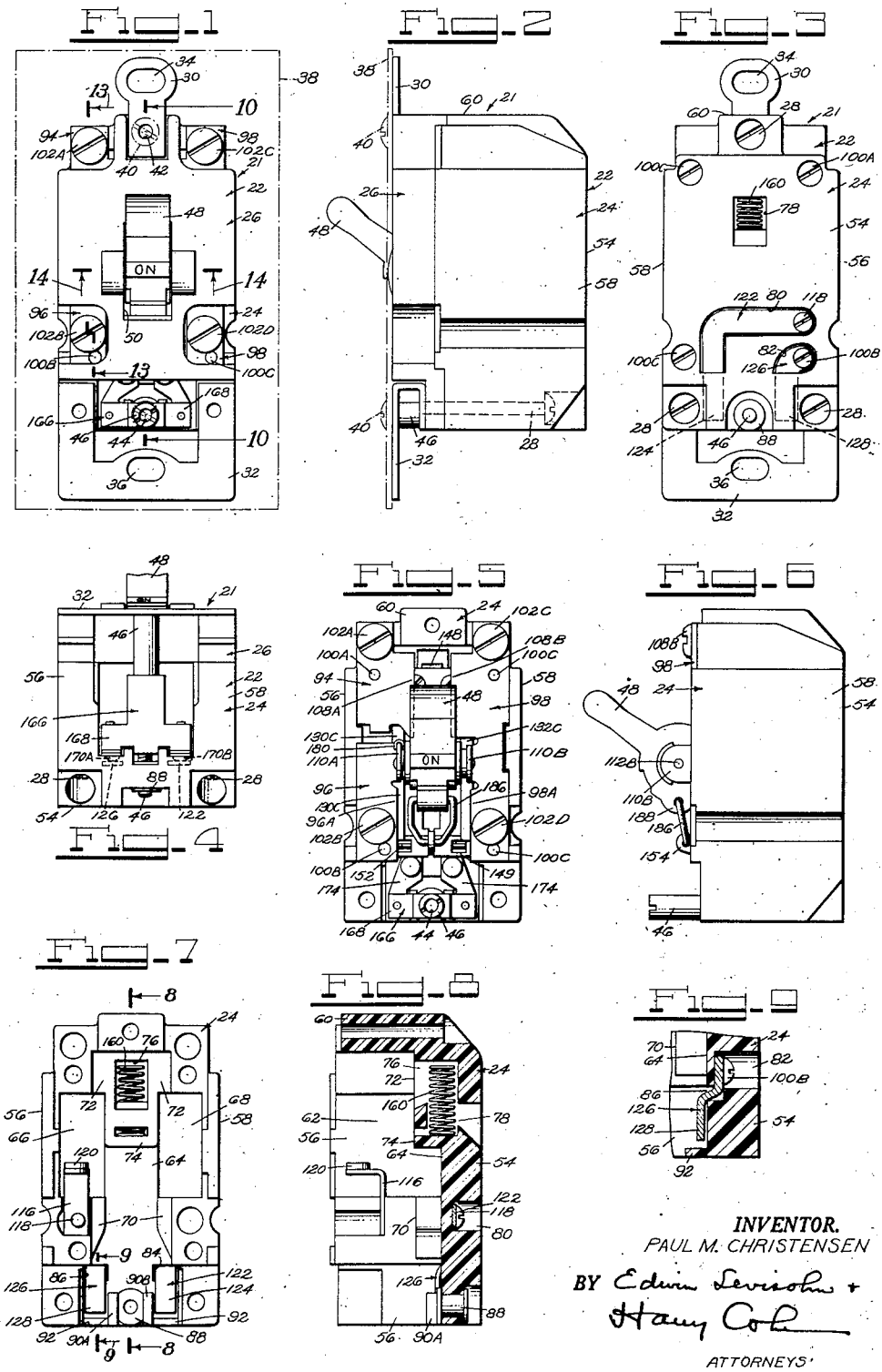
INVENTOR.
PAUL M. CHRISTENSEN
BY Edwin Levisohn +
Harry Cole
ATTORNEYS

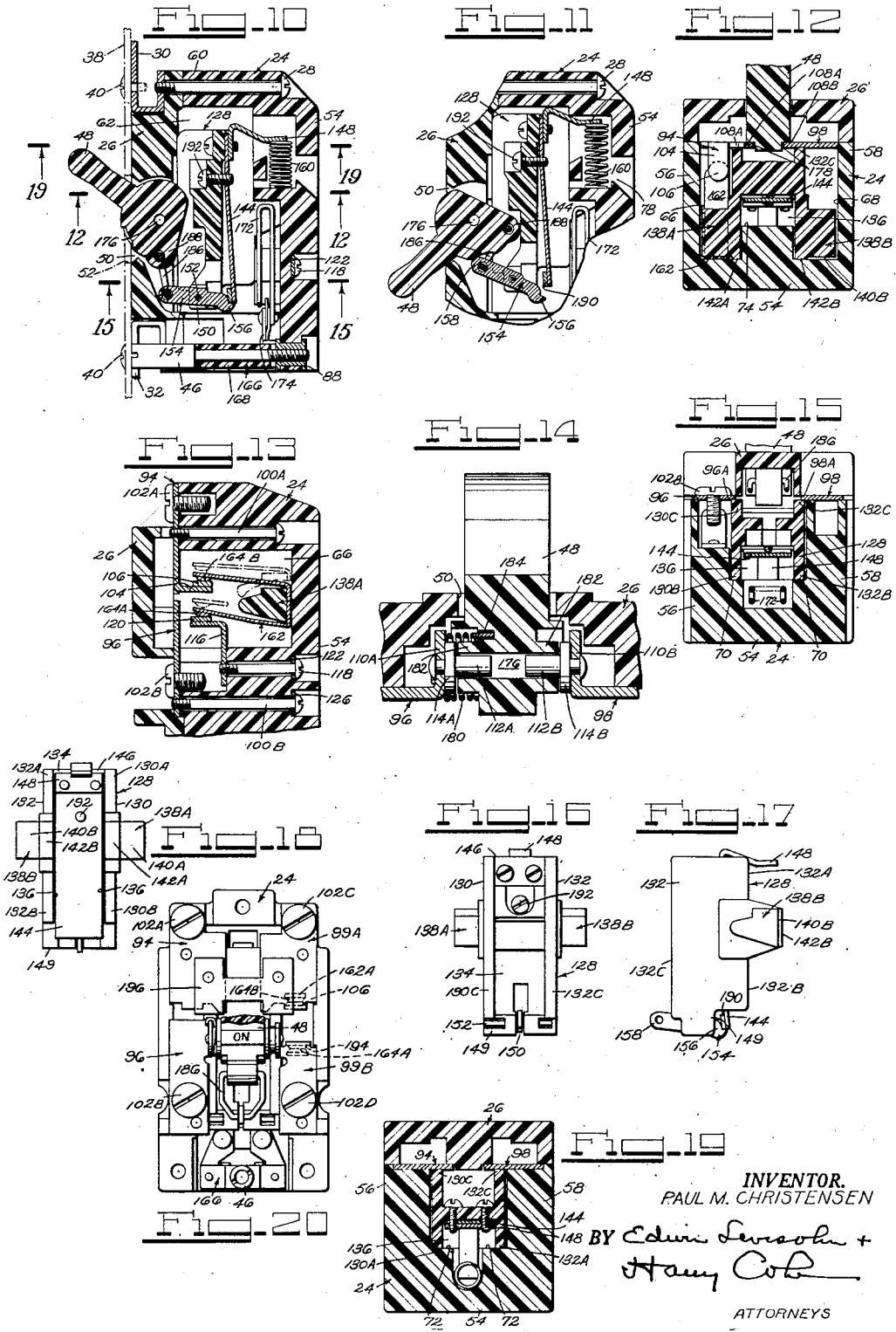

Patented Aug. 11, 1953

2,648,736

UNITED STATES PATENT OFFICE 2,648,736

AUTOMATIC CIRCUIT BREAKER

Paul M. Christensen, West Orange, N. J., assignor to Federal Electric Products Company, Newark, N. J., a corporation Application October 8, 1949, Serial No. 120,361

20 Claims. (Cl. 200—116)

This invention relates generally to an automatic circuit breaker, and more specifically to a circuit breaker that is particularly adapted for motor starting and similar purposes.

The object of the present invention is the provision of a circuit breaker of generally simplified construction and design and of improved operation.

Another object is the provision of a circuit breaker having improved means for securing a cover plate thereto.

The above and other objects, features and advantages of the present invention will be fully understood from the following description considered in connection with the accompanying illustrative drawings.

In the drawings:

Fig. 1 is a front view of a circuit breaker embodying the invention, said circuit breaker being shown in the "On" or circuit-closed position;

Fig. 2 is a side view of the circuit breaker;

Fig. 3 is a rear view of the circuit breaker;

Fig. 4 is a bottom view of the circuit breaker;

Fig. 5 is a view similar to Fig. 1 showing the circuit breaker with the casing closure thereof removed;

Fig. 6 is a view similar to Fig. 2 with the closure removed;

Fig. 7 is a front view of the casing body with some parts in position therein;

Fig. 8 is a sectional view taken on the line 8—8 of Fig. 7;

Fig. 9 is a fragmentary sectional view taken on the line 9—9 of Fig. 7;

Fig. 10 is a sectional view taken on line 10—10 of Fig. 1;

Fig. 11 is a fragmentary sectional view similar to Fig. 10 showing the circuit breaker in its "Off" or circuit-open position;

Fig. 12 is a sectional view taken on line 12—12 of Fig. 10;

Fig. 13 is a sectional view taken on line 13—13 of Fig. 1;

Fig. 14 is a sectional view taken on line 14—14 of Fig. 1;

Fig. 15 is a sectional view taken on line 15—15 of Fig. 10;

Fig. 16 is a front view of the movable contact carrier;

Fig. 17 is a side view of the movable contact carrier;

Fig. 18 is a rear view of the movable contact carrier;

Fig. 19 is a sectional view taken on line 19—19 of Fig. 10; and

Fig. 20 is a view similar to Fig. 5 showing another form of the invention.

Referring to the drawings, the circuit breaker 21 is housed in a casing 22 preferably molded from a suitable insulating material, said casing being preferably formed of the separate casing parts 24 and 26, the former part constituting an insulating casing block or body portion, the latter part constituting a closure therefor. These parts are connected by suitable means, such as screws 28, and together they constitute a housing enclosure for the circuit breaker mechanism. As illustrated in Figs. 2 and 10 the front ends of screws 28 engage the brackets 30 and 32 which may serve as a means for supporting the circuit breaker. The circuit breaker may be mounted in a suitable enclosure or box, such as, for example, the box illustrated and described in the patent to Joseph Sachs, No. 2,094,963, dated October 5, 1937. For this purpose, the brackets 30 and 32 are provided with the apertures 34 and 36, respectively, for receiving screws or other suitable attaching elements. Provision is also made for attaching a standard flush-type wall plate or cover member to the circuit breaker. An example of such a wall plate 38 is illustrated, in broken lines, in Figs. 1, 2 and 10, it being noted that said plate may be attached by suitable means, such as screws 40, 40, which are engaged, respectively, in aperture 42 in bracket 30, and in the internally threaded upper portion 44 of a screw 46 hereinafter fully described.

The circuit breaker is provided with a pivoted handle or operating member 48 substantially centrally thereof. Said handle projects through a suitable slot 50 in the closure member 26. Due to the central disposition of the handle, it will also project through the slot 52 in the standard wall plate 38.

The casing block 24 comprises the rear wall 54, the opposing lateral walls 56 and 58, and the upper end wall 60, said block being open at its lower end, and said walls defining the chamber or opening 62 (Fig. 8) at the front thereof. The upper surface of rear wall 54 is provided with an integral raised portion or ledge 64 (Figs. 7 and 8) extending longitudinally thereof and disposed substantially centrally between lateral walls 56 and 58, said portion and said lateral walls defining the companion guideways 66 and 68, the function of which is hereinafter described. Extending outwardly from the opposing ends of said guideways, at the sides thereof defined by ledge 64, are the companion pairs of guide parts 70, 70, and 72, 72, respectively, said guide parts extending above the bottom surface of said guideways. It will be noted that ledge 64 is provided with a raised part 74 in which is defined a recess 76, open at the front thereof, and provided at its rear with the opening 78 extending through rear wall 54, said recess extending between the guide parts 72, 72. Rear wall 54 is also provided, on its outer surface, with the recessed portions 80, 82 which communicate with the openings 84 and 86, respectively, extending through the rear wall, as illustrated in Figs. 3, 7 and 9, adjacent the lower end thereof. At said lower end, the rear wall is provided with an internally threaded bushing 88, which is positioned between ridges 90A and 90B, and the raised marginal edge portions 92, 92 extending between said ridges and the side walls 56, 58, respectively.

The front of chamber 62 in the casing block is partially covered by the separate terminal members 94 and 96, respectively, at one side thereof, and by the unitary terminal member 98, on the other side thereof. As here shown, terminal member 94 is mounted on the casing block by a screw 100A and is provided with a conventional terminal screw 102A for connection to an electrical conductor. Terminal member 94 is also provided with a downwardly extending part 104 (Fig. 13) which carries a stationary contact 106, and with a laterally extending integral guide part 108A, as hereinafter described. Terminal member 96 is also secured to the casing block by a screw 100B and is provided with a terminal screw 102B. In addition, terminal member 96 is provided with an upwardly extending part or ear 110A (Fig. 14) in which there is riveted an axially extending pintle 112A provided with a collar 114A which abuts said ear. The terminal member 98 is mounted in the casing block by screws 100C, 100C, in the same manner as terminal members 94 and 96 and is similarly provided with the spaced terminal screws 102C, 102D. Said terminal member 98 is provided with a laterally extending integral guide part 108B and with the ear 110B in which there is riveted the axially extending pintle 112B provided with the collar 114B which abuts said ear.

Underlying terminal member 96, the casing block is provided with a contact member 116 (Figs. 7, 8 and 13) which is mounted thereon by screw 118. Said contact member is provided with a stationary contact 120, companionate to contact 106. A conducting member or strap 122 is secured in the aforementioned recess 80, in the outer surface of rear wall 54, by the screw 118 which also secures contact member 116 in the block. Said strap extends through opening 84 in the rear wall and the free end 124 thereof, is secured against lateral movement on said rear wall by ridge 90B and lateral wall 58. A conducting strap 126 is secured in the recess 82 by screw 100B which also secures terminal member 96 on the block. Said strap 126 extends through opening 86 and the free end 128 thereof, is secured against lateral movement on the rear wall by ridge 90A and lateral wall 56.

An insulated movable contact carrier or slide 128 (Figs. 16, 17 and 18) is disposed within chamber 62 for rectilinear movement in the casing block. Said carrier is molded of insulation material and is provided with opposing walls 130 and 132 which are integrally joined with the axially extending cross part 134, said walls depending below said part and defining therewith the recess 136 (Figs. 12, 15 and 18). Said walls are provided substantially midway of their lower marginal edges with the integral depending and laterally extending portions 138A and 138B, respectively. It will be noted that the bottom surface 140A and 140B, respectively, of said portions is provided with a downwardly extending portion 142A and 142B (Fig. 12), respectively, inwardly thereof. A thermostatically responsive element, here shown as the bi-metallic flexible strip or latch 144, is disposed in recess 136 and is secured at one of its ends to the upper end 146 of part 134. A rearwardly extending metallic lug 148 is also secured at said upper end, said lug clamping said bi-metallic strip to the carrier. At its lower end 149, part 134 is slotted, as at 150. A transversely extending pivot pin 152 is secured in said lower end and extends across said slot. Actuating means comprising a lever 154, is provided at one end with a tooth or latch member 156 and at its other end with an apertured portion 158, and is mounted intermediate its ends, in said slot for pivotal movement on said pin.

A helical compression spring 160 is vertically disposed in the aforementioned recess 76, and when the movable contact carrier is positioned in the casing block, as shown in Figs. 10 and 11, the lug 148 engages the upper end of the spring. It will be understood that the spring may be inserted in the chamber through the opening 78 and that it will be retained in vertical disposition therein by the walls thereof. To facilitate the disposition of the lug on the upper end of the spring, any suitable tool may be inserted through the opening 78 for depressing the spring as the lug is inserted in the chamber. It will be understood that the spring is compressed by the lug during the downward movement of the carrier and biases the carrier to its normal or retracted position, said position representing the "Off" or open condition of the circuit breaker as hereinafter described.

When the movable contact carrier is mounted in the casing block, the portions 138A and 138B, thereof, straddle the raised portion 74 of ledge 64, as shown in Fig. 12, said raised portion constituting the front wall of chamber 76. The bight of a U-shaped conducting member or strap 162 (Figs. 12 and 13) is disposed on the upper surface of the previously mentioned guideway 66 and is retained thereon, between the depending portion 142A and the lateral wall 56, by part 138A, the sides of said part being straddled by the upwardly extending flexible arms of said conducting member. Said arms are provided, at the upper ends thereof with the movable contacts 164A and 164B which cooperate with the fixed contacts 120 and 106, respectively. It will be apparent that when the movable contact carrier is subjected to the rectilinear motion thereof, as will hereinafter appear, the parts 138A and 138B move in the guideways 66 and 68, respectively, and are retained against lateral movement by the lateral casing-block walls and ledge 74. It will be apparent that during such movement, the conducting member 162 is carried by part 138A from the position, indicated in broken line in Fig. 13, wherein the movable contacts 164A and 164B are disengaged from the stationary contacts 120 and 106, respectively, to a position in which the cooperating contacts are engaged, as illustrated in said figure. It will be understood that when the movable contacts engage the stationary contacts, the arms of the conducting member flex to provide a resilient pressure of said movable contacts against said stationary contacts, respectively. During said movement of the contact carrier, the lower marginal edge portions of the walls 130 and 132 of the carrier serve as runners or slides to facilitate the rectilinear travel of the carrier. Specifically, the rearward runner portions 130A and 132A, of carrier side walls 130 and 132, respectively, slide on the aforementioned rearward guide parts 72, 72, as illustrated in Fig. 19, the adjacent side wall portions being retained against lateral movement by the side walls 56 and 58, respectively, of the casing block. The forward runner portions 130B and 132B, of the respective carrier side walls, similarly serve as runners or slides and slide on the aforementioned forward guide parts 70, 70, as illustrated in Fig. 15, and the adjacent side wall portions are similarly retained against lateral movement by the side walls 56 and 58, respectively, of the casing blocks. During said movement, the upper marginal edges 130C and 132C, respectively, of the carrier walls are guided and retained in the block by the completely overlying guide parts 108A and 108B of terminal members 94 and 98, respectively, as illustrated in Figs. 5, 12 and 19, and by the partially overlying portions 96A and 98A of terminal members 96 and 98, as illustrated in Figs. 5 and 15.

In the normal or closed condition of the circuit breaker, the stationary contacts 120 and 106 are engaged by the movable contacts 164A and 164B, respectively, to complete an electrical circuit through the circuit breaker. Assuming that the terminal screws 102A and 102C are connected to the power line and that a suitable load is connected to the terminal screws 102B and 102D, respectively, the circuit is completed from one end of the power line through terminal member 94, engaged contacts 106 and 164B, through the movable contact member 162, through engaged contacts 164A and 120, through the contact member 116, through screw 118, through strap 122, through a heater unit 166, hereinafter described, and to the terminal screw 102B of terminal member 96, to which one side of the load is connected. The other end of the power line is connected directly to the load through the terminal member 98.

The heater unit 166 may be of any suitable type wherein the passage of current therethrough generates heat. A here shown (Figs. 4 and 10), said heater is provided with an insulated body portion 168 which is secured in the aforementioned bushing 88 in the casing block by the externally threaded portion of the aforementioned screw 46, the upper internally threaded portion 44 of said screw serving to secure the wall plate or cover member 38 to the circuit breaker, as previously described. The heater is provided with the contacts 170A and 170B which engage the free ends of straps 126 and 122, respectively, the heater element 172 being connected to the contacts by suitable conducting portions 174. As shown in Fig. 10, the heater element extends into the casing block from the open end thereof, and underlies the previously mentioned flexible bi-metallic latch 144.

For actuating the movable contact carrier for normal switching purposes, or to effect closing of the circuit after the automatic opening thereof, there is provided the aforementioned handle or actuating element 48 which is provided with means for effecting the rectilinear movement of the movable contact carrier. As here shown (Fig. 14), the handle is provided with a bearing bore 176 in which are disposed the aforementioned pintles 112A and 112B, the handle being pivotally rotatable about said pintles. The portions 108A and 108B of terminal members 94 and 98, respectively, serve as a detent or stop for the handle when rotated to the circuit closing position, as shown in Fig. 12, the hub of said handle being provided with cut-out portions 178, 178 which engage said terminal members portions. When the handle is rotated to the open circuit position of the circuit breaker, a detent or stop is provided therefor by the apertured end 158 of lever 154, as illustrated in Fig. 11. The handle is biased to the open circuit position thereof by a torsional spring 180 which is positioned about the lateral handle hub 182, one end of said spring being engaged in the opening 184 in the handle and the other end thereof being secured to the aforementioned ear 110A (Figs. 5 and 14). Operating means comprising a link 186 (Fig. 5) interconnects the handle and lever 154, said link being pivoted to the handle at 188 and pivoted to the lever at 158. Under normal conditions, i. e., in the absence of flexing of strip 144 upon overload, the tooth 156 of the lever 154 is engaged by the wear piece 190 at the free end of the bi-metallic latch 144, as illustrated in Fig. 10, and the handle is thereby operatively connected to the movable contact carrier for moving the latter, the spring 160 biasing the carrier to the circuit open position, as heretofore described.

When the bi-metallic latch is engaged by the lever, as in Fig. 10, link 186 cooperates with the handle to form a toggle. As the handle is rotated to the On, or closed circuit position, as illustrated in Fig. 10, the handle part 188 is moved forwardly from the position illustrated in Fig. 11 to the position illustrated in Fig. 10, and the link, being engaged in said part, transmits the forward motion to the lever which is carried by the movable contact carrier, the lever being retained against pivotal movement by its engagement with latch 144 and serving to move the carrier to its operating position. During said movement of the carrier, the movable contact member 162 is carried along guideway 66 by the part 138A to move contacts 164A and 164B into firm engagement with the fixed contacts 120 and 106, respectively. It will be understood that the above described toggle action of handle 48 and link 186, in the overcentered condition of the toggle (Fig. 10), is sufficiently strong to resist both the tendency of the spring 160 to move the carrier to the Off position and the tendency of spring 180 to move the handle to said position. It will be observed, however, that until bimetallic strip 144 flexes and releases lever 154, spring 160 maintains the toggle in overcentered condition against the action of handle spring 180.

The above described toggle action can be released by pressing the handle downward, the parts then moving under the action of both springs to the open circuit condition shown in Fig. 11, it being understood that the lever normally remains in engagement with the latch 144 in said position. The movable contacts 164A and 164B are thus disengaged from the companion stationary contacts and the circuit is broken in two separate places thereby. By moving the handle toward the upward position the several parts can be restored to their respective closed-circuit positions, as shown in Fig. 10, and the circuit can thus be re-established.

As before explained, the bi-metallic strip 144 overlies the heater element 172 which is electrically connected in series with both the movable and fixed contacts. Said strip is adapted to be deflected rearward, (as illustrated in Fig. 11)

upon the passage of excess current through the heater element with the result that the wear piece 190 is disengaged from the tooth 156 of lever 154 and the carrier is freed for movement by spring 160 to disengage contacts 164A and 164B from stationary contacts 120 and 106. It will be noted that when strip 144 disengages lever 154 the toggle constituted by the handle and by link 186 collapses and spring 180 is thereupon effective to move the handle to its "Off" position and to position the end 156 of lever 154 so that it can engage the end piece 190 of bi-metallic strip 144, when the latter flexes back to its normal condition upon cooling, to re-close the circuit breaker by movement of the handle to its "On" position. It will be noted also that the handle 48 is in tripfree relation to carrier 128 and accordingly that even if the handle were held stationary during the occurrence of an overload, this would not prevent or otherwise interfere with the automatic opening of the circuit breaker.

Means for calibrating the circuit breaker is provided by the screw 192 (Figs. 10 and 11) which engages the movable contact carrier and the thermostatic strip 144 near the fixed end thereof. It will be understood that the free end of the strip may be moved closer to, or farther away from, the lower surface of cross-part 134 of the movable contact carrier thereby requiring an increased or decreased deflection, as the case may be, to unlatch the strip.

In the form of the invention illustrated in Fig. 20, the circuit breaker is converted from the previously described single-pole switch into a double-pole switch thereby providing for two additional breaks on the other side of the circuit in the open condition thereof. As here shown, the unitary terminal member 98 is replaced by a pair of terminal members 99A and 99B, provided with the terminal screws 102C and 102D, respectively. Terminal member 99A is in all respects the same as terminal member 94 being provided with an integral stationary contact 106 and terminal member 99B is in all respects similar to terminal member 96 except that it is provided with an integral stationary contact 194. It will be understood that an additional movable contact member 162A is now provided which is carried by the part 138B in the same manner as the contact member 162 is carried by the part 138A. It will be apparent that in the closed circuit condition, the stationary contacts 106 and 194 are engaged by the movable contacts 164B and 164A, respectively, to complete a circuit between one side of the power line connected at 102C and one side of the load connected at 102D. It will be apparent that when the circuit breaker is moved to its open-circuit condition, as heretofore described, there will be two breaks in said side of the line, when the contacts are disengaged. If preferred, an insulating strip 196 may be positioned across terminals 94 and 99A, as shown in Fig. 20.

Certain of the features illustrated and described herein are claimed in my divisional application, Serial Number 281,583, filed April 10, 1952.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. In an automatic circuit breaker having a casing, a stationary contact carried by said casing, a carrier guided for movement in said casing, a movable contact member operable by said carrier to engage and disengage said stationary contact, said movable contact member being free from fixed connection to said carrier and the latter having a part which slidably disposes said movable contact member on a casing portion and holds the same against bodily movement in relation to the carrier in a direction parallel to the path of said movement of said carrier, and companion means on said carrier and on said casing for guiding said movable contact member for bodily movement toward and away from said stationary contact to engage and disengage the latter.

2. In an automatic circuit breaker having a casing, a stationary contact carried by said casing, a slide guided for rectilinear movement in said casing, a movable contact member operable by said slide to engage and disengage said stationary contact, said movable contact member being free from fixed connection to said slide and the latter having a part which engages said movable contact member and holds the same against bodily movement in relation to the slide in a direction parallel to the path of said rectilinear movement of said slide, and companion means on said slide and on said casing for guiding said movable contact member for rectilinear bodily movement toward and away from said stationary contact to engage and disengage the latter, said companion means and said slide part defining a guideway in which said movable contact member is disposed.

3. In an automatic circuit breaker having a casing, a stationary contact carried by said casing, a carrier guided for rectilinear movement in said casing, a movable contact member operable by said carrier to engage and disengage said stationary contact, said movable contact member being free from fixed connection to said carrier and the latter having a part which engages said movable contact member and holds the same against bodily movement in relation to the carrier in a direction parallel to the path of said rectilinear movement of said carrier, and companion means on said carrier and on said casing for guiding said movable contact member for rectilinear bodily movement toward and away from said stationary contact to engage and disengage the latter, said companion means and said carrier part defining a guideway in which said movable contact member is disposed, said guide means on said casing and carrier comprising, respectively, wall portions of said casing and adjacent portions of said carrier.

4. In an automatic circuit breaker having a casing, a pair of stationary contacts provided in said casing, a carrier guided for movement in said casing, a movable contact member, a pair of contacts carried by said movable contact member, said movable contact member being operable by said carrier to engage and disengage the contacts carried thereby and said stationary contacts, said movable contact member being free from fixed connection to said carrier and the latter having a part which engages said movable contact member and holds the same against bodily movement in relation to the carrier in a direction parallel to the path of said movement of said carrier, and companion means on said carrier and on said casing for guiding said movable contact member for bodily movement toward and away from said stationary contact to engage and disengage the latter, said companion means and said slide part defining a guideway in which said movable contact member is disposed.

5. In an automatic circuit breaker, as set forth in claim 4, said movable contact member being a conducting strap and said carrier part being a lateral extension thereof engaging said strap and mounting the trap externally of the carrier.

6. In an automatic circuit breaker, as set forth in claim 4, said movable contact member being a U-shaped member, and said carrier part being a lateral extension thereof in engagement with the bight of said U-shaped member, said bight being slidably disposed in said guideway.

7. In an automatic circuit breaker having a casing, a stationary contact carried by said casing, a carrier guided for rectilinear movement in said casing, a movable contact member operable by said carrier to engage and disengage said stationary contact, said movable contact member being free from fixed connection to said carrier and the latter having a part which engages said movable contact member and holds the same against bodily movement in relation to the carrier in a direction parallel to the path of said rectilinear movement of said carrier, and companion means on said carrier and on said casing for guiding said movable contact member for rectilinear bodily movement toward and away from said stationary contact to engage and disengage the latter, said guide means on said casing comprising wall portions thereof defining a guideway extending in a direction parallel to the path of movement of said carrier, said movable contact member being movably mounted in said guideway, and said carrier part extending into said guideway and engaging said movable contact member for guiding and retaining the latter therein.

8. In an automatic circuit breaker having a casing, a stationary contact carried by said casing, a carrier guided for rectilinear movement in said casing, a movable contact member operable by said carrier to engage and disengage said stationary contact, said movable contact member being free from fixed connection to said carriage and the latter having a part which engages said movable contact member and holds the same against bodily movement in relation to the carrier in a direction parallel to the path of said rectilinear movement of said carrier, and companion means on said carrier and on said casing for guiding said movable contact member for rectilinear bodily movement toward and away from said stationary contact to engage and disengage the latter, said guide means on said casing comprising wall portions thereof defining a guideway extending in a direction parallel to the path of movement of said carrier, and a guide part extending from said guideway, said movable contact member being movably disposed in said guideway, and said carrier part extending into said guideway and engaging said movable contact member for guiding and retaining the latter therein, said carrier member being provided with a runner portion slidably engageable with said guide part.

9. In an automatic circuit breaker having a casing, spaced stationary contacts in said casing, a carrier member guided for movement in said casing, and a U-shaped movable contact member operable by said carrier to engage and disengage said stationary contacts, the arms of said movable contact member being flexible and provided with contacts positioned thereon to engage and disengage said stationary contacts, respectively, said carrier member having a part in fixed relation thereto which projects between said arms and engages the latter inwardly of said contacts thereon for moving said movable contact member to engage the contacts thereof with and to disengage them from said stationary contacts, said stationary contacts being disposed in the path of movement of said arms, whereby said arms will flex when the contacts on the latter engage said stationary contacts for providing a resilient pressure of said movable contacts against said stationary contacts, respectively.

10. In an automatic circuit breaker having a casing, a stationary contact member carried by said casing, a carrier guided for movement in said casing, a movable contact member operable by said carrier to engage and disengage said stationary contact member, said movable contact member being free from fixed connection to said carrier and the latter having a part which slidably disposes said movable contact member on a casing portion and holds the same against bodily movement in relation to the carrier in a direction parallel to the path of said movement of said carrier, companion means on said carrier and on said casing for guiding said movable contact member for bodily movement toward and away from said stationary contact to engage and disengage the latter, and means on said casing for biasing said carrier for movement in a direction to disengage said contacts.

11. In an automatic circuit breaker having a casing, a stationary contact member carried by said casing, a carrier guided for movement in said casing, a movable contact member operable by said carrier to engage and disengage said stationary contact member, said movable contact member being free from fixed connection to said carrier and the latter having a part which engages said movable contact member and holds the same against bodily movement in relation to the carrier in a direction parallel to the path of said movement of said carrier, companion means on said carrier and on said casing for guiding said movable contact member for bodily movement toward and away from said stationary contact to engage and disengage the latter, and means on said casing for guiding and retaining said carrier during said movement thereof, said latter means comprising a portion of said stationary contact member overlying said carrier, said carrier being in sliding engagement with said overlying portion.

12. In an automatic circuit breaker having a casing, a stationary contact carried by said casing at each side thereof, a carrier guided for movement in said casing, a pair of movable contact members each operable concomitantly by said carrier to engage and disengage one of said stationary contacts, said movable contact members being free from fixed connection to said carrier and the latter having separate parts which engage each of said movable contact members, respectively, and hold the same against bodily movement in relation to the carrier in a direction parallel to the path of said movement of said carrier, and companion means on said carrier and on said casing for guiding said movable contact members for bodily movement toward and away from said stationary contacts to engage and disengage the latter said companion means defining parallel guideways in which said movable contact members are disposed, and each of said separate carrier parts extending into one of said guideways and engaging the movable contact member therein for guiding and retaining the latter therein.

13. In an automatic circuit breaker having a casing, a stationary contact carried by said casing at each side thereof, a carrier guided for movement in said casing, a pair of movable contact members each operable concomitantly by said carrier to engage and disengage one of said stationary contacts, said movable contact members being free from fixed connection to said carrier and the latter having separate parts which engage each of said movable contact members, respectively, and holds the same against bodily movement in relation to the carrier in a direction parallel to the path of said movement of said carrier, and companion means on said carrier and on said casing for guiding said movable contact members for bodily movement toward and away from said stationary contacts to engage and disengage the latter, said casing being provided with a rear wall and opposing lateral walls, said guide means on said casing comprising an axially extending upwardly offset portion of said rear wall, a guideway defined between said offset portion and each of said lateral walls, each of said movable contact members being movably disposed in one of said guideways, and each of said separate carrier parts extending into one of said guideways and engaging the movable contact member therein for guiding and retaining the latter therein.

14. In an automatic circuit breaker having a casing, a stationary contact carried by said casing, a carrier guided for rectilinear movement in said casing, a movable contact member operable by said carrier to engage and disengage said stationary contact, a thermostatic latch mounted on and bodily movable with said carrier, said latch terminating in a free end, a lever pivoted between its ends on said carrier and having one end releasably engaged by said end of the latch in the normal load conditions of the circuit breaker, a link pivoted to the other end of said lever, a pivotally movable operating handle pivoted to said link and forming a toggle therewith for holding the circuit breaker in closed position when the toggle is overcentered and said lever engages said latch, and spring means operating between said casing and said carrier for biasing said carrier to open-circuit position and for moving said carrier to said open-circuit position when said latch disengages said lever.

15. In an automatic circuit breaker having a casing, a stationary contact carried by said casing, a carrier guided for rectilinear movement in said casing, a movable contact member operable by said carrier to engage and disengage said stationary contact, a thermostatic latch mounted on and bodily movable with said carrier, a lever pivoted between its ends on said carrier and having one end releasably engaged by said latch in the normal load conditions of the circuit breaker, a link pivoted to the other end of said lever, a pivotally movable operating handle pivoted to said link and forming a toggle therewith for holding the circuit breaker in closed position when the toggle is overcentered and said lever engages said latch, and spring means operating between said casing and said carrier for biasing said carrier to open-circuit position and for moving said carrier to said open-circuit position when said latch disengages said lever; said carrier being provided with a member having a part engageable with said spring means and a part securing said thermostatic latch to said carrier.

16. In an automatic circuit breaker having a casing, a stationary contact carried by said casing, a carrier guided for rectilinear movement in said casing, a movable contact member operable by said carrier to engage and disengage said stationary contact, a thermostatic latch mounted on and bodily movable with said carrier, a lever pivoted between its ends on said carrier and having one end releasably engaged by said latch in the normal load conditions of the circuit breaker, a link pivoted to the other end of said lever, a pivotally movable operating handle pivoted to said link and forming a toggle therewith for holding the circuit breaker in closed position when the toggle is overcentered and said lever engages said latch, spring means operating between said casing and said carrier for biasing said carrier to open-circuit position and for moving said carrier to said open-circuit position when said latch disengages said lever, and a terminal member provided with said stationary contact carried by said casing, said terminal member overlying said carrier and being in slidable engagement therewith for retaining and guiding the latter therein, said terminal member being engaged by said operating handle in the closed position of said circuit breaker and serving as a detent therefor to limit the movement of the handle in one direction.

17. In an automatic circuit breaker having a casing, a stationary contact carried by said casing, a carrier guided for rectilinear movement in said casing, a movable contact member operable by said carrier to engage and disengage said stationary contact, a thermostatic latch mounted on and bodily movable with said carrier, a lever pivoted between its ends on said carrier and having one end releasably engaged by said latch in the normal load conditions of the circuit breaker, a link pivoted to the other end of said lever, a pivotally movable operating handle pivoted to said link and forming a toggle therewith for holding the circuit breaker in closed position when the toggle is overcentered and said lever engages said latch, and spring means operating between said casing and said carrier for biasing said carrier to open-circuit position and for moving said carrier to said open-circuit position when said latch disengages said lever, said lever being engaged by said operating handle in the open position of said circuit breaker and serving as a detent therefor to limit movement of the handle in one direction.

18. In an automatic circuit breaker having a casing, a stationary contact carried by said casing, a carrier guided for rectilinear movement in said casing, a movable contact member operable by said carrier to engage and disengage said stationary contact, a thermostatic latch mounted on and bodily movable with said carrier, a lever pivoted between its ends on said carrier and having one end releasably engaged by said latch in the normal load conditions of the circuit breaker, a link pivoted to the other end of said lever, a pivotally movable operating handle pivoted to said link and forming a toggle therewith for holding the circuit breaker in closed position when the toggle is overcentered and said lever engages said latch, spring means operating between said casing and said carrier for biasing said carrier to open-circuit position and for moving said carrier to said open-circuit position when said latch disengages said lever, and a terminal member carried by said casing, said terminal member overlying said carrier and being in slidable engagement therewith for retaining and guiding the latter therein, said terminal member being engaged by said operating handle in the closed position of said circuit breaker and serving as a detent therefor to limit movement of the handle in one direction, said lever being engaged by said operating handle in the open position of said circuit breaker and serving as a detent therefor to limit movement of the handle in the opposite direction.

19. In an automatic circuit breaker having a casing, a stationary contact carried by said casing, a slide guided for rectilinear movement in said casing, a movable contact member disposed externally of said slide and operable by said slide to engage and disengage said stationary contact, said movable contact member being free from fixed connection to said slide and the latter having a part which engages said movable contact member and holds the same against bodily movement in relation to the slide in a direction parallel to the path of said rectilinear movement of said slide, and companion means on said slide and on said casing for guiding said movable contact member for rectilinear bodily movement toward and away from said stationary contact to engage and disengage the latter.

20. In an automatic circuit breaker having a casing, a stationary contact carried by said casing, a carrier guided for movement in said casing, a movable contact member operable by said carrier to engage and disengage said stationary contact, said movable contact member being free from fixed connection to said carrier and the latter having a part which engages said movable contact member and holds the same against bodily movement in relation to the carrier in a direction parallel to the path of said movement of said carrier, and companion means on said carrier and on said casing for guiding said movable contact member for bodily movement toward and away from said stationary contact to engage and disengage the latter, said movable contact member being flexible, and said stationary contact being disposed in the path of movement of said movable contact member, whereby the latter will flex when the latter engages said stationary contact for providing a resilient pressure of said movable contact member against said stationary contact.

PAUL M. CHRISTENSEN.

References Cited in the file of this patent

UNITED STATES PATENTS

| Number | Name | Date |
| --- | --- | --- |
| 1,726,503 | Platt | Aug. 27, 1929 |
| 2,094,963 | Sachs | Oct. 5, 1937 |
| 2,094,964 | Sachs | Oct. 5, 1937 |
| 2,185,524 | Sachs | Jan. 2, 1940 |
| 2,202,626 | Frank | May 28, 1940 |
| 2,210,261 | Sachs | Aug. 6, 1940 |
| 2,210,262 | Sachs | Aug. 6, 1940 |
| 2,303,693 | Hill | Dec. 1, 1942 |
| 2,521,561 | Batcheller | Sept. 5, 1950 |